United States Patent
Piot et al.

(10) Patent No.: US 6,809,727 B2
(45) Date of Patent: Oct. 26, 2004

(54) ROLLER WITH TACTILE FEEDBACK

(75) Inventors: Julien Piot, Rolle (CH); Laurent Plancherel, Lausanne (CH); Florian M. Kehlstadt, Aclens (CH); Marc A. Bidiville, Monaco (MC); Antoine Merminod, Gimel (CH); Baptiste Merminod, Vevey (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 72 days.

(21) Appl. No.: 09/934,460

(22) Filed: Aug. 21, 2001

(65) Prior Publication Data

US 2003/0038774 A1 Feb. 27, 2003

(51) Int. Cl.[7] .................................................. G09G 5/00
(52) U.S. Cl. ....................................... 345/184; 345/156
(58) Field of Search ................................ 345/156, 157, 345/163–166, 184; 463/37; 74/469, 471

(56) References Cited

U.S. PATENT DOCUMENTS 4,318,095 A * 3/1982 Fukuoka ..................... 345/184
6,128,006 A * 10/2000 Rosenberg et al. ......... 345/163
6,300,938 B1 * 10/2001 Culver ........................ 345/156
2002/0054011 A1 * 5/2002 Bruneau et al. ............ 345/156

OTHER PUBLICATIONS

IBM TDB, "Mouse Ball–Activating Device With Force and Tactile Feedback", Feb. 1, 1990, vol. 32, Issue 9B, pp. 230–235.*

* cited by examiner

Primary Examiner—Alexander Eisen
(74) Attorney, Agent, or Firm—Townsend and Townsend and Crew LLP

(57) ABSTRACT

A roller on a mouse or other input device imparts a resistance effect to a user with low power. The invention uses an autoblocking mechanism, such as a brake, which derives the force from the force of the user's finger pushing against the autoblocking mechanism. In one embodiment, a braking mechanism using two small rollers biased against the bigger roller or wheel is used. As the user applies a turning force to the wheel, it wedges against one of the two small rollers, depending on the direction, providing the feeling of resistance to the user as the wheel is turned. In another embodiment of the invention, local feedback is provided on a ratchet-type effect. In another embodiment of the invention, feedback is provided through the roller even when the cause of the feedback is something other than the roller.

8 Claims, 11 Drawing Sheets

ROLLER WITH TACTILE FEEDBACK

BACKGROUND OF THE INVENTION

The present invention relates to a roller or wheel on an input device, such as a mouse. In particular, it relates to providing a feedback force to the user of the roller.

A roller is typically used on a mouse in addition to the primary input which comes from moving the mouse around on a ball protruding from the bottom of the mouse housing. Alternately, an optical sensor may be used instead of a ball. Other input devices, such as a track ball with the ball on top, a joystick, etc., will have a movable portion for providing the input. In addition to this movable portion, a roller may be added as well. The roller can be used for such functions as scrolling or zooming. The roller is operated by a user's finger, much like a dial on a radio.

There are a number of different designs for such rollers on a mouse or other device. Examples include Multipoint Technology Corporation U.S. Pat. No. 5,298,919, Microsoft U.S. Pat. No. 5,473,344, Apple Computer U.S. Pat. Nos. 5,313,230 and 5,095,303, Mouse Systems U.S. Pat. Nos. 5,530,455 and 5,446,481, Primax Electronics U.S. Pat. No. 5,808,568, and Logitech U.S. Pat. No. 6,157,369.

Force feedback has been used in different input devices, including mice. Examples of force feedback mechanisms can be found in a number of patents assigned to Immersion Corporation, such as U.S. Pat. No. 5,825,303, No. 5,734,373, No. 5,767,839, No. 5,721,566, No. 5,805,140, No. 5,691,898 and No. 5,828,197.

Immersion Corporation U.S. Pat. No. 6,128,006 describes force feedback on a mouse wheel (roller). The mechanism shown is a motor either directly connected to the axle of the mouse wheel, or a pulley drive coupled to the axle. A passive actuator such as a magnetic particle brake or a friction brake is discussed.

U.S. Pat. No. 6,128,006 also describes a number of different types of feedback. The feedback can be provided to simulate the ratchet effect currently provided by mechanical spring-type mechanisms in mouse wheels. The feedback can also be used to provide user feedback when a line is crossed on a document on a display. Similar feedback can be provided for the end of the page or the end of a document. The patent also describes providing an amount of feedback which is related to the size of the document.

U.S. Pat. No. 6,128,006 also describes that when the wheel is used for a cursor, feedback can be provided on graphic items that the cursor passes over.

A disadvantage of force feedback is the power required to provide the force which is felt by the user. This is particularly problematic for a cordless mouse or other device which relies on batteries, or on a device which is powered off of the limited power from the universal serial bus (USB).

BRIEF SUMMARY OF THE INVENTION

The present invention provides a roller on a mouse or other input device which can passively impart an effect to a user with low power. The invention uses an autoblocking mechanism, such as a brake, which derives its force from the force of the user's finger pushing against the autoblocking mechanism. This provides an open-loop system which relies on the force of the user's finger, and thus can operate at low power.

In one embodiment, a braking mechanism using two small rollers biased against the bigger roller or wheel is used. As the user applies a turning force to the wheel, it wedges against one of the two small rollers, depending on the direction, providing the feeling of resistance to the user as the wheel is turned. In an alternate embodiment, a brake shoe is rotated until it contacts the outside periphery of the wheel. Continued rotation of the wheel by the user provides the desired resistance, and rotates the brake shoe to change the contact point between the brake shoe and the wheel. The present invention advantageously uses the force from the user's own finger to translate into a resistance signal, minimizing the amount of force needed to be provided by an electromagnet or motor.

In another embodiment of the invention, an open loop signal is used to provide a ratchet-type effect. In addition, instead of signals going to the host computer and then a force feedback signal being provided back to the mouse, the host is bypassed. This provides faster turnaround, which is important especially for a shared bus communication to the host. The wheel sensor signal indicating turning of the wheel is provided to a local processing circuit, which then activates the actuator for the resistance mechanism within the mouse at intervals corresponding to the amount of turning, to provide a ratchet feel.

For a further understanding of the nature and advantages of the invention, reference should be made to the following description taken in conjunction with the accompanying drawings.

DETAILED DESCRIPTION OF THE INVENTION

Figure 1:
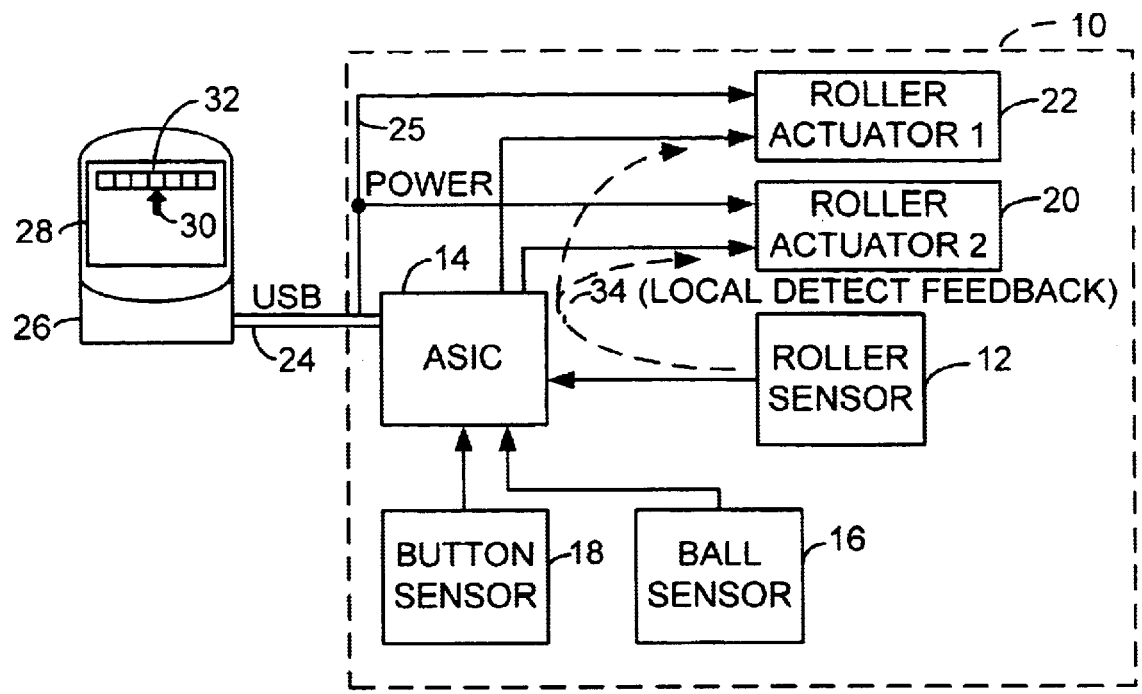
FIG. 1 is a block diagram of the electronics of the tactile feedback according to one embodiment of the present invention.

FIG. 1 is a block diagram of the electronic system for tactile feedback according to an embodiment of the invention. Shown is a mouse 10 which has a roller sensor 12 for detecting the movement of a roller or wheel. The sensor signals are provided to a processing circuit in an ASIC 14. ASIC 14 also receives signals from a mouse sensor 16 and button sensors 18. Mouse sensor 16 provides detector signals from two encoder rollers on a mouse ball, or alternately an optical signal on an optical mouse.

ASIC 14 also controls two roller actuators 20 and 22 which provide a braking function against the mouse roller or wheel, as will be described below. These actuators receive their power on lines 25 from a USB 24. Thus, the amount of power used by the actuators needs to be minimized. The sensor signals received by ASIC 14 are put into a packet format and transmitted over USB 24 to a host computer 26 for controlling a display 28. Host 26 may provide feedback signals back to ASIC 14 in response to the position of a cursor 30 on display 20, such as being over a graphic icon 32. Alternately, the feedback can be in response to simple scrolling, zooming, page changes or line changes of the display. Examples of such types of feedback are set forth in U.S. Pat. No. 6,126,006, referenced above, and incorporated herein by reference.

In one mode, instead of a sensor signal being sent to the host, and feedback signals being received back, the host can be bypassed. This is particularly useful for providing a detent feel to rotation of the mouse roller. In prior rollers, this has been done mechanically through the use of a spring mechanism mounted in the mouse. In the present invention, this can be provided through the tactile feedback mechanism using the detent local feedback path indicated by the dotted line 34 in FIG. 1. When a roller sensor signal from roller sensor 12 indicates that the roller has been turned a predetermined amount, a signal can be provided to the appropriate roller actuator of roller actuators 20 and 22. This will provide a brief braking movement so that the user has the feeling of going over a series of detents as the mouse wheel is turned. The use of such local feedback eliminates the need to send data over the USB or over a wireless link, removing bandwidth concerns and also providing more instantaneous feedback. The actuator used for such a local tactile feedback system can be either the partially passive mechanism of the present invention, or an active force feedback mechanism as described in the prior art.

Figure 2:
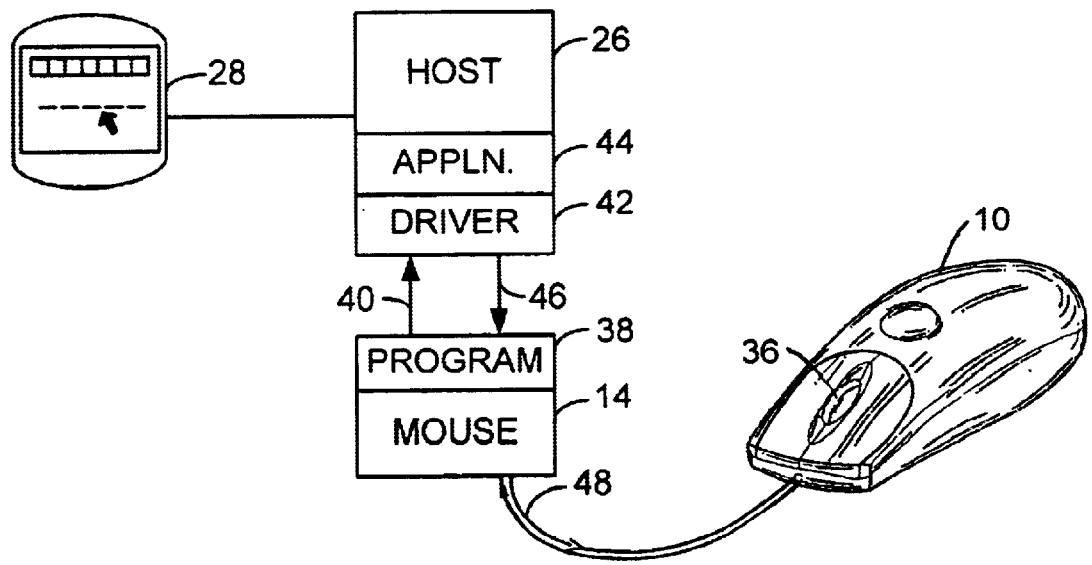
FIG. 2 is a block diagram of the tactile feedback software according to an embodiment of the invention.

FIG. 2 is a block diagram of the software used in an embodiment of the present invention. Shown is a mouse 10 with a roller 36. Inside mouse 10 is a processor or ASIC 14 including a program 38 for controlling the mouse. Sensor signals 40 are provided to host computer 26, in particular to a driver 42 in the host. The driver in turn can provide signals to an application program 44, which controls the particular graphics on a display 28. Upon certain conditions, such as scrolling up a line or page, or over a graphic icon, a tactile feedback signal can be provided from application program 44 to driver 42 and back to ASIC 14 as control commands 46. In response to these, program 38 provides signals 48 to solenoids, electromagnets, or motors in mouse 10 which control the autoblocking or braking of wheel 36.

Figure 3:
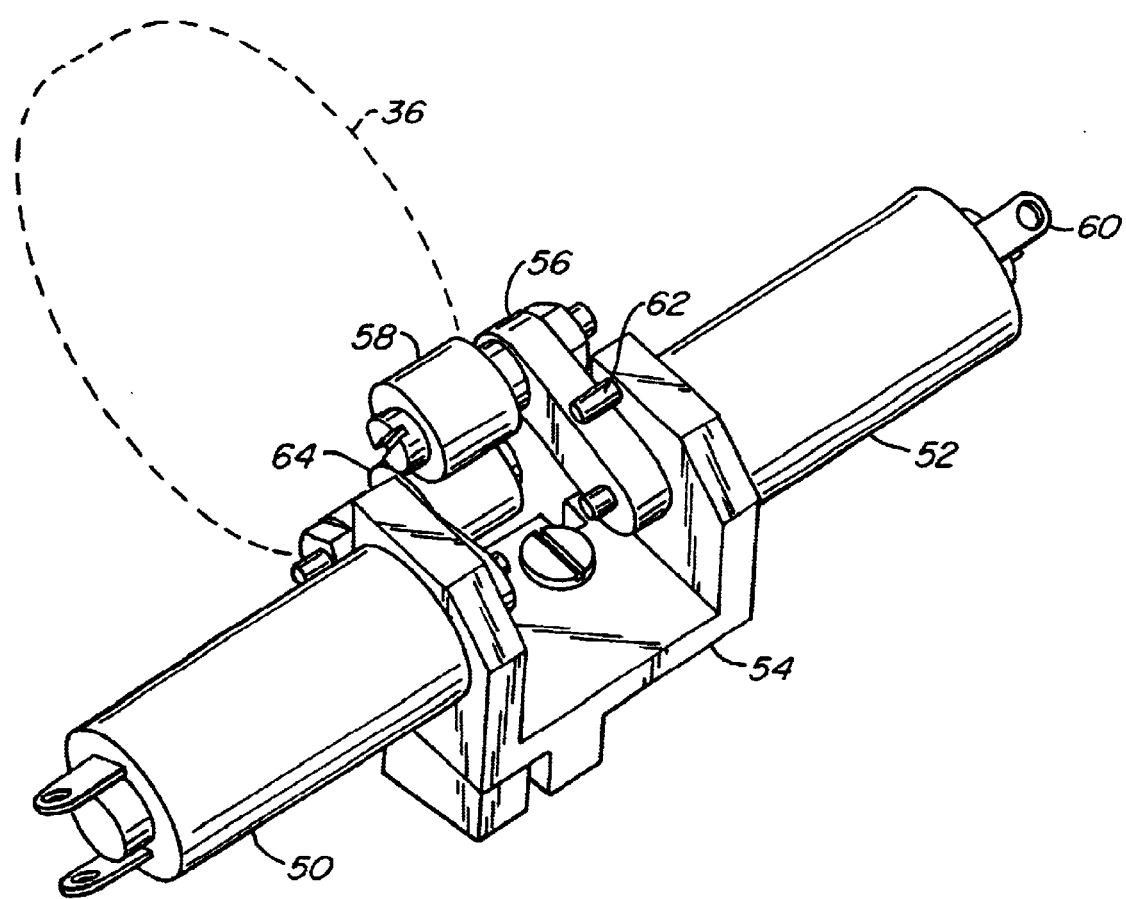
FIG. 3 is a perspective view of a dual roller braking mechanism according to an embodiment of the invention.

FIG. 3 is a perspective view of one embodiment of a dual roller braking mechanism according to the invention. The figure shows two motors or solenoids 50 and 52 mounted on a support 54. Motor 52 includes an axle connected to a pivot arm 56, which in turn is connected to a roller 58. When activated by a current applied through a contact 60, pivot arm 56 will be moved away from a stop pin 62 to bias roller 58 against the mouse wheel 36. Similarly, motor 50 activates another lever arm to control a second roller 64. The particular roller chosen depends upon the direction of movement of wheel 36.

Figure 4:
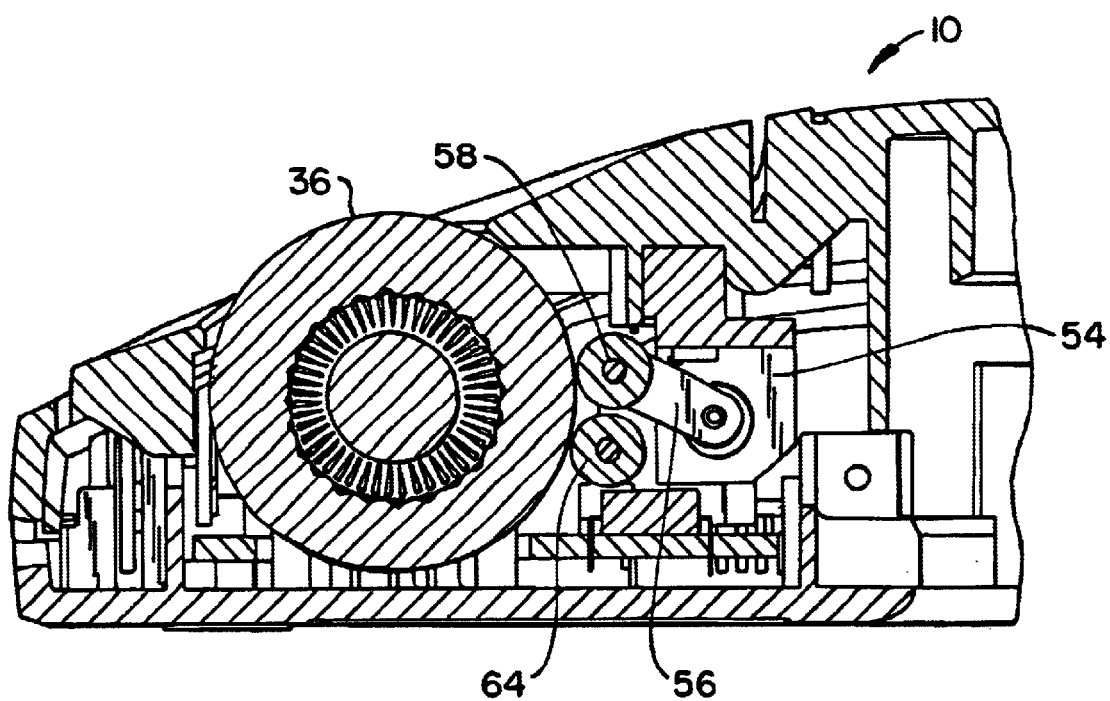
FIG. 4 is a side view of a mouse incorporating the dual rollers of FIG. 3.

FIG. 4 shows a side view of the mechanism of FIG. 3 mounted in a mouse 10. Looking at FIG. 4, when wheel 36 is rotating clockwise, to the right, roller 58 would be biased against it to provide a braking force. Since roller 58 is slightly above the center line of the axis of wheel 36 and the rotating axis of arm 56, the movement of the wheel 36 against roller 58 will try to push roller 58 downward. This pushing movement will increase the amount of force applied. This in effect magnifies the amount of force felt by the user by harnessing the force generated by the user's own finger, as opposed to requiring significant electrical current generating an opposing force. The present invention allows a minimal amount of current to bias the roller against the mouse wheel, with the majority of the force being supplied by the user's finger itself.

Figure 5:
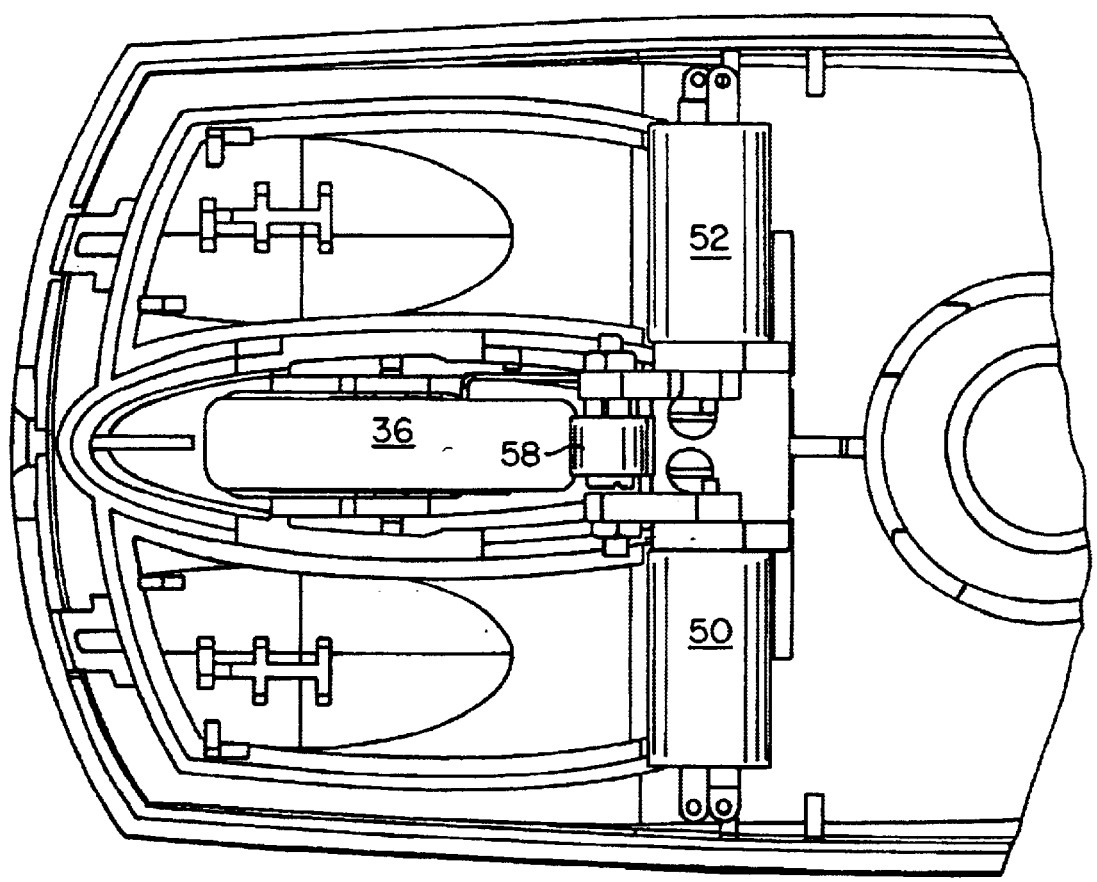
FIG. 5 is a top view of a mouse incorporating the dual rollers of FIG. 3.

FIG. 5 is top view showing wheel 36 and motors 50 and 52, with only roller 58 being visible in this view.

Figure 6A:
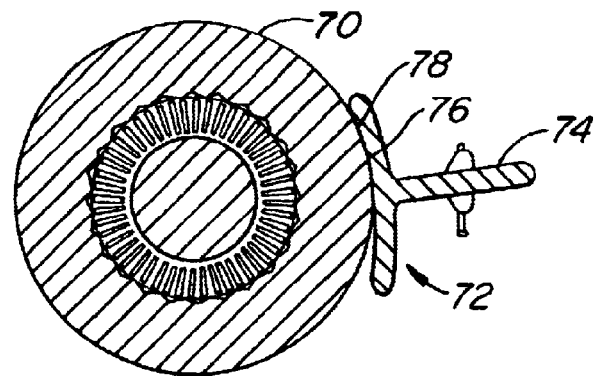
FIGS. 6A–6E illustrate different elements of a tilting brake shoe embodiment using a voicecoil.

FIG. 6A is a side view of a wheel 70 with resistance being provided by a brake shoe 72. The brake shoe is tilted by moving a shaft 74 up or down. When the user is rotating wheel 70 down toward the brake shoe, in the clockwise or right direction in FIG. 6A, the brake shoe is tilted down until it contacts the wheel at a contact point 76. Continued movement by the user against the wheel will rotate the wheel, with the outer rubber of the wheel deforming, until a contact point 78 is reached. Contact point 78 has a angle greater than a friction angle, such that excessive force by the user will cause the wheel to slip past the brake shoe, avoiding damage to the mechanism.

Figure 6B:
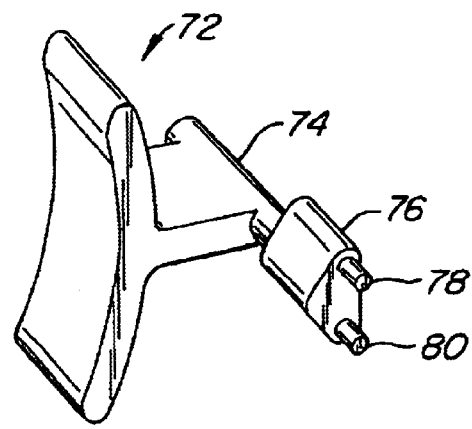

FIG. 6B is a perspective view of the brake shoe 72. As can be seen, shaft 74 is connected to a member 76 which has a pair of protruding pins 78 and 80.

Figure 6C:
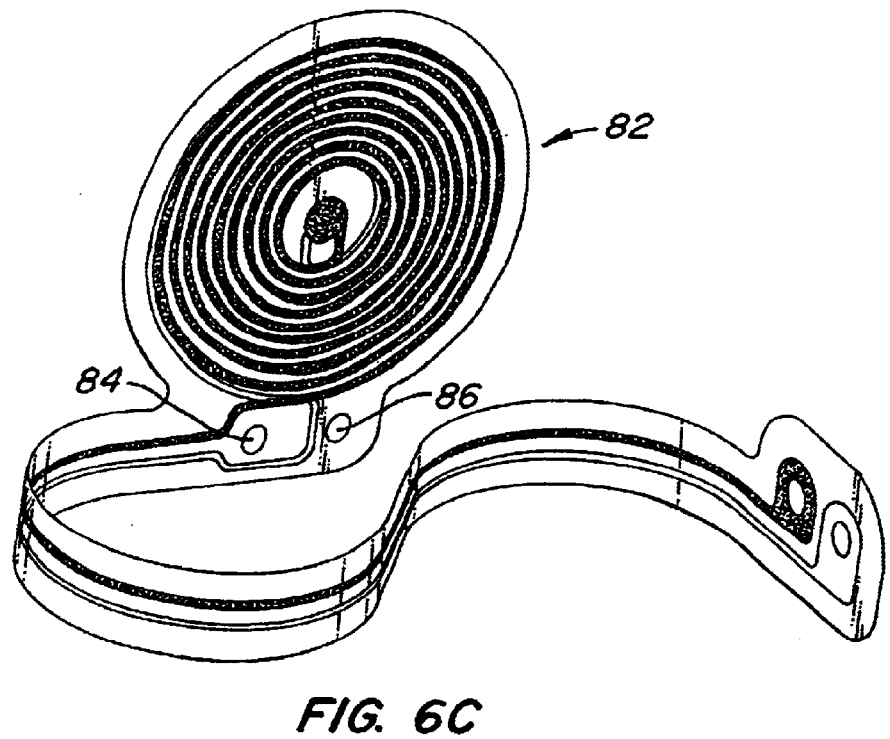

Turning to FIG. 6C, a diagram is shown of a voice coil 82 having a pair of holes 84 and 86 which mate with pins 78 and 80. Upon activation of the voice coil, the voice coil will push on one or other of the pins, causing the shaft and brake shoe to rotate. Although the voice coil is a thin, flexible material, it has sufficient rigidity in the plane of the voice coil to move the pins.

Figure 6D:
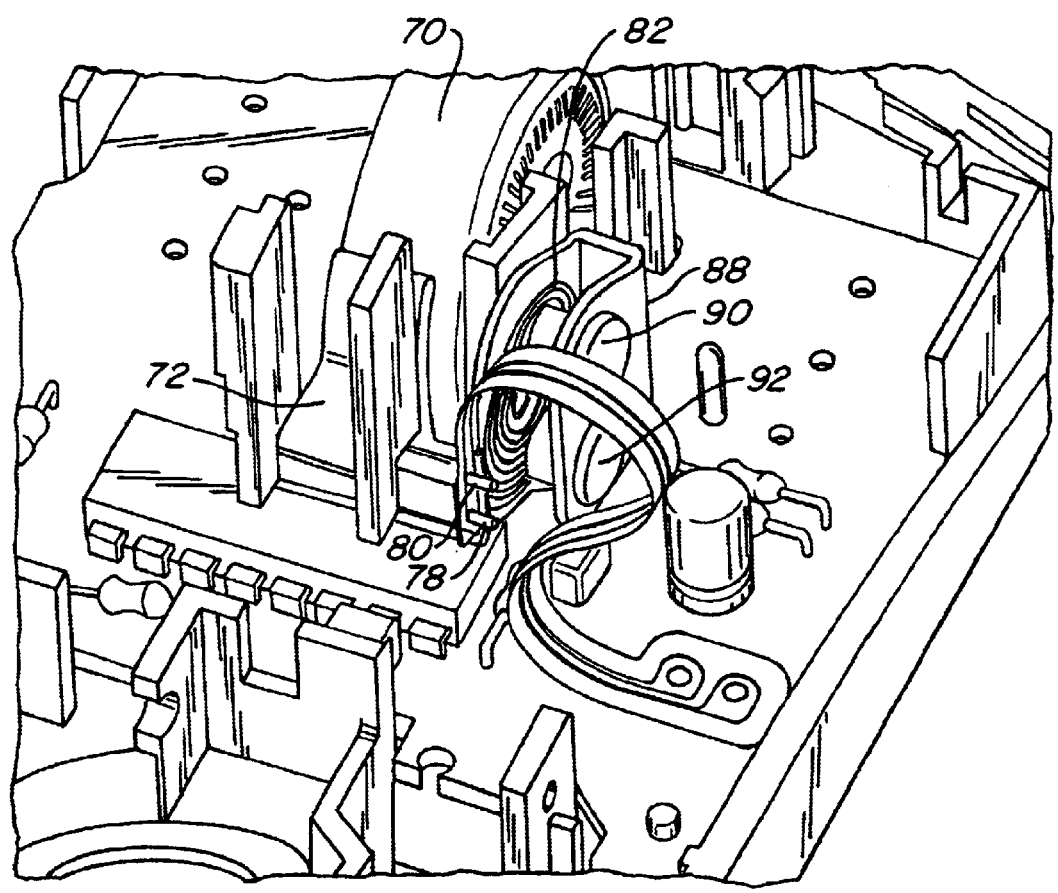

FIG. 6D is a perspective view of the overall system, including wheel 70 and brake shoe 72 with protruding pins 78 and 80. The voice coil 82 is mounted in a pole piece 88 having a pair of magnets 90 and 92. When the voice coil is activated, it will react with the magnets and push on one or the other of the pins, causing the brake shoe to rotate either up or down.

Figure 6E:
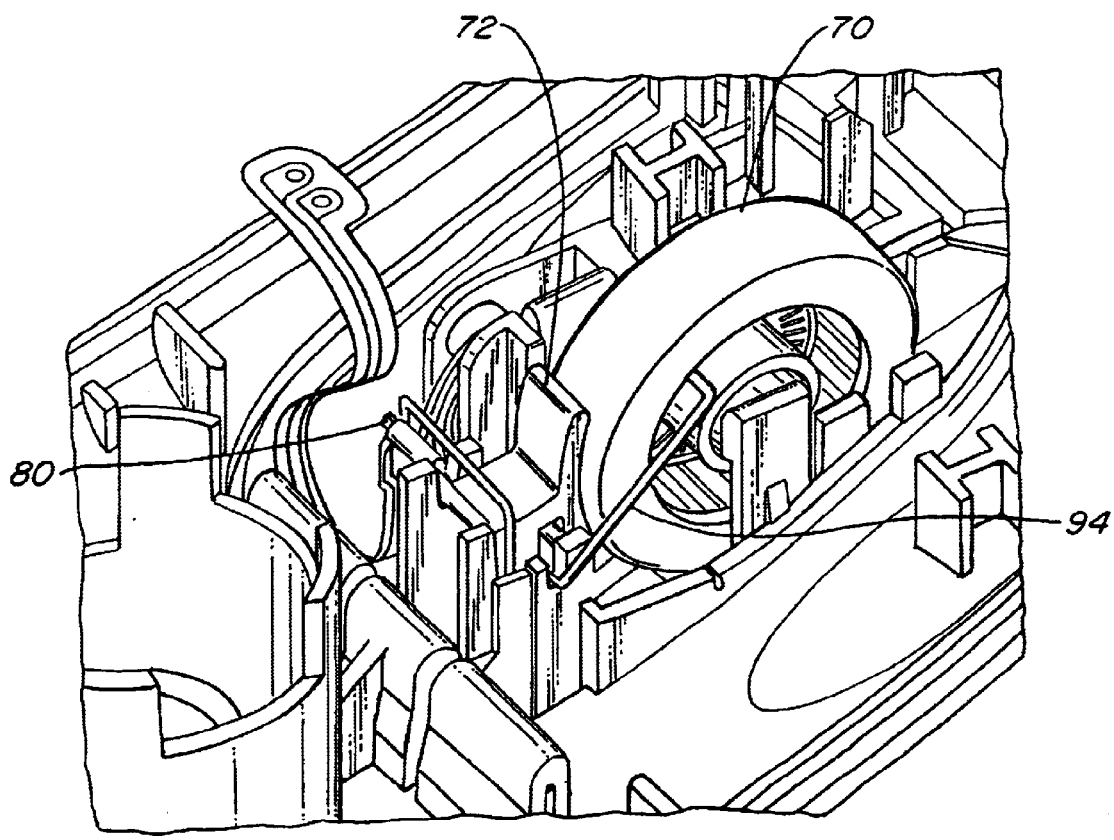

FIG. 6E is another perspective view of the arrangement of FIG. 6D, this time showing a spring 94. Spring 94 performs two functions. First, it provides the ratchet effect by contacting the inner, serrated edge of the wheel. Second, it also is biased against the two pins 78 and 80 to return the brake shoe to its center, non-contact position upon deactivation of the voice coil.

Figure 7A:
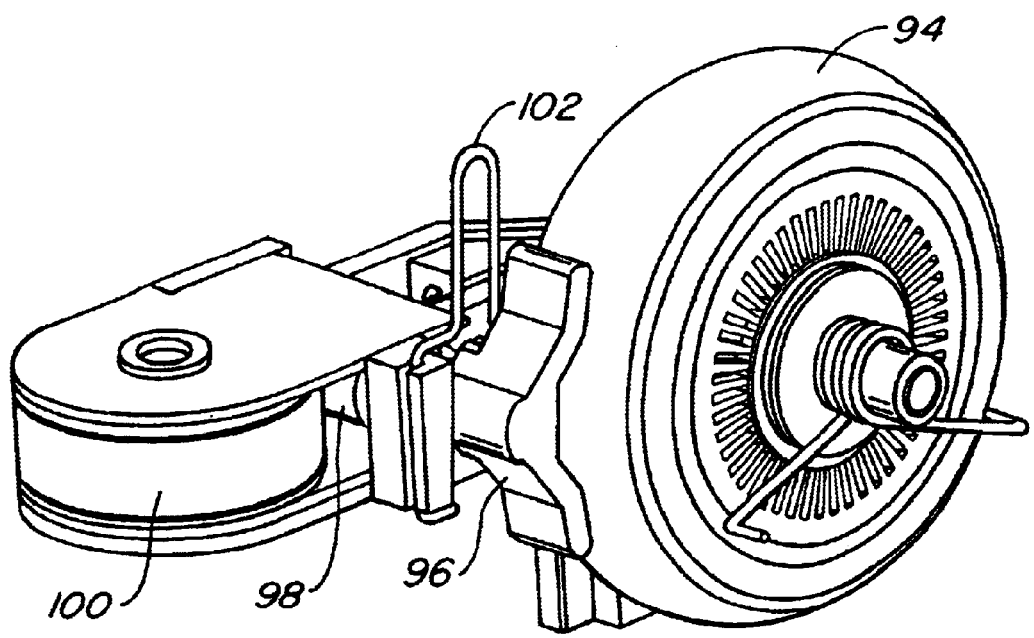
FIGS. 7A–7C illustrate different views and features of a second tilting brake shoe embodiment using a magnetic brake shaft and coil.

FIG. 7A is a perspective view of another embodiment of the invention. In FIG. 7A, a wheel 94 has a braking force applied by a brake shoe 96. Brake shoe 96 has a shaft 98 with an internal magnet, which interacts with an electromagnetic coil 100. A centering spring 102 holds the brake shoe in its center position in the absence of an applied current to the coil 100.

Figure 7B:
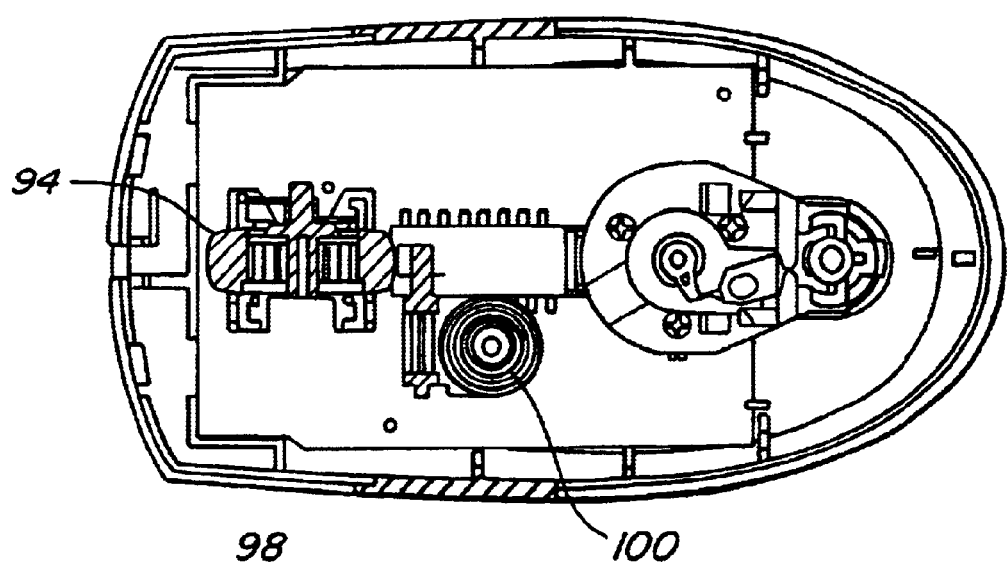
Figure 7C:
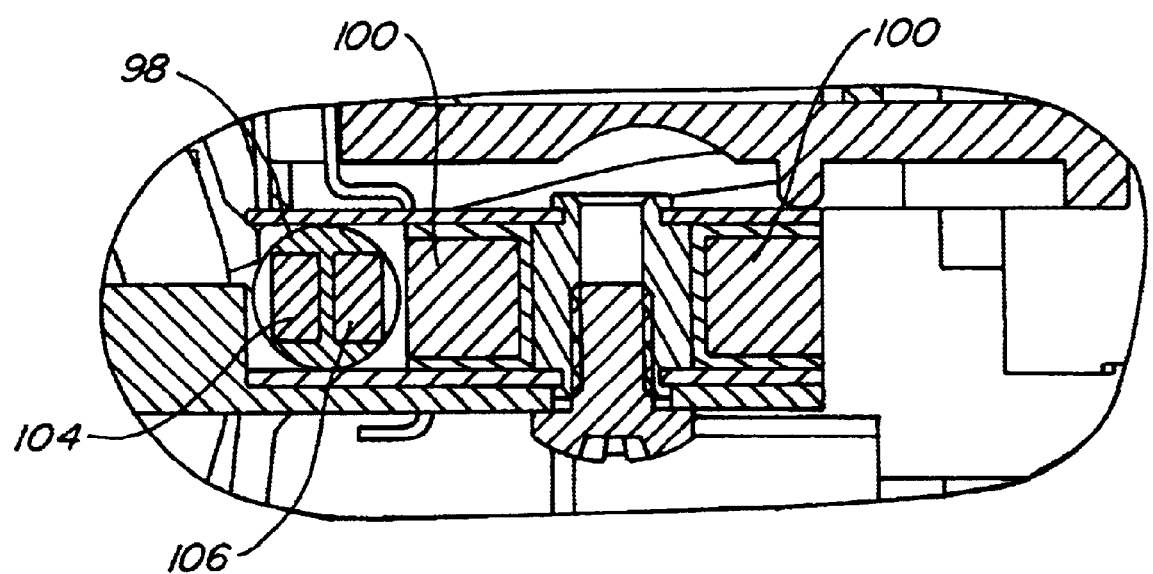

FIG. 7B is a top, cutaway view showing coil 100 and brake shaft 98 from the top. FIG. 7C is a cutaway side view showing brake shaft 98 with two internal magnets 104 and 106. The cutaway portion of the coil is shown as squares 100.

The design of FIGS. 7A–7C is useful when there is limited space in the mouse or other input device. The coil and shaft arrangement can also provide a stronger force than the voice coil of FIGS. 6A–6E. The centering spring is needed because the system of FIGS. 7A–7C is unstable when the voice coil turns the magnetic shaft.

Figure 8A:
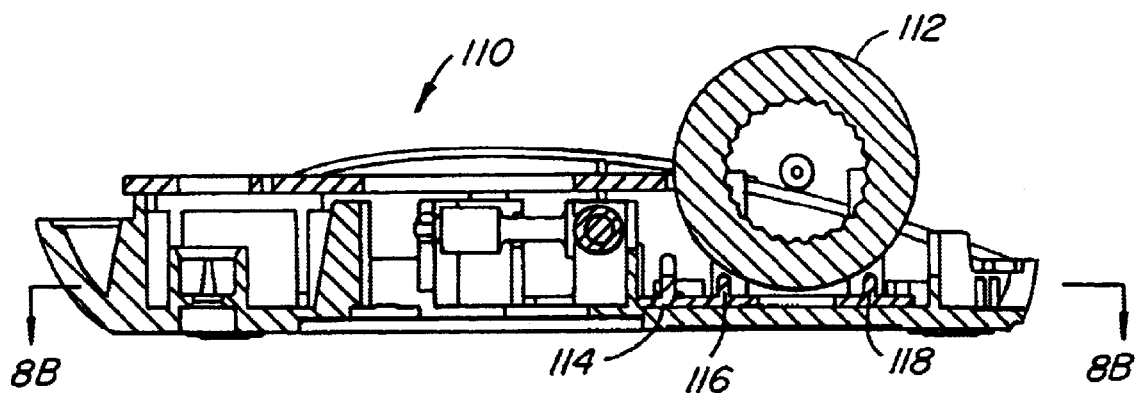
FIGS. 8A–8C illustrate different views and elements of a third embodiment using an elongate plate with dual ribs for providing the braking action.

FIG. 8A is a side view of yet another embodiment showing a mouse 110 in which limited space is available for mounting an actuator next to wheel 112. In this embodiment, a plate 114 beneath the wheel has a pair of ribs 116 and 118.

By sliding plate 114 left or right, a braking action is provided by biasing the ribs against the wheel 112.

Figure 8B:
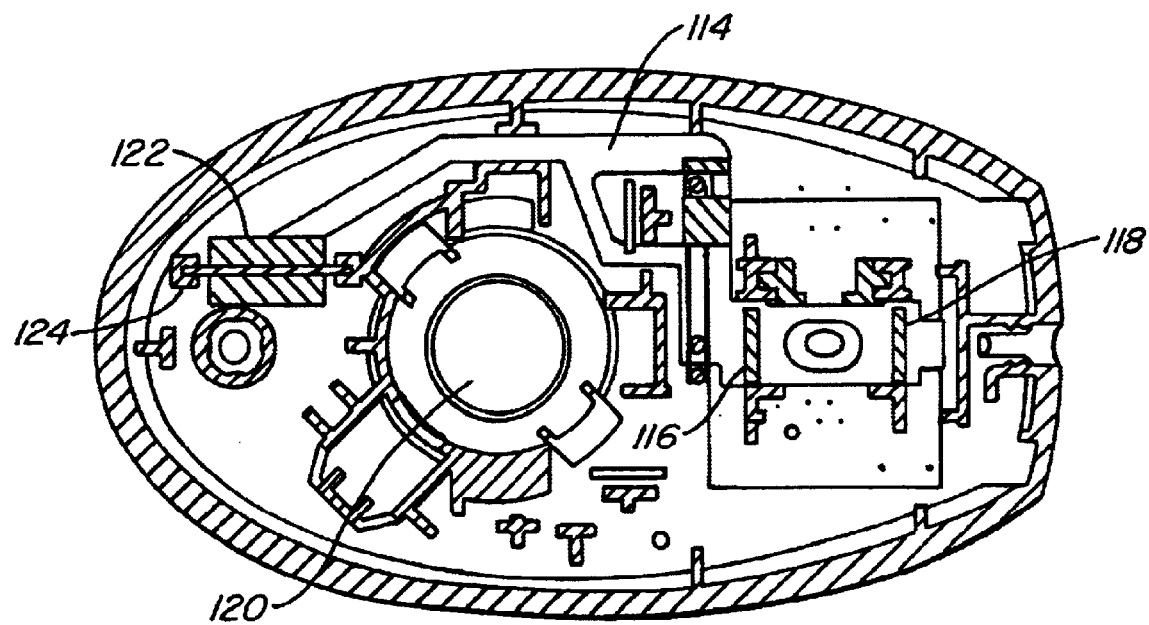

FIG. 8B shows a top view illustrating the plate, or brake link, 114 which winds around a center ball mechanism of the mouse 120 to a permanent magnet block 122 and coil arrangement 124 at the rear of the mouse. This actuator (the coil and magnets) is on the opposite side of the ball cage 120 from the braking ribs 116 and 118.

Figure 8C:
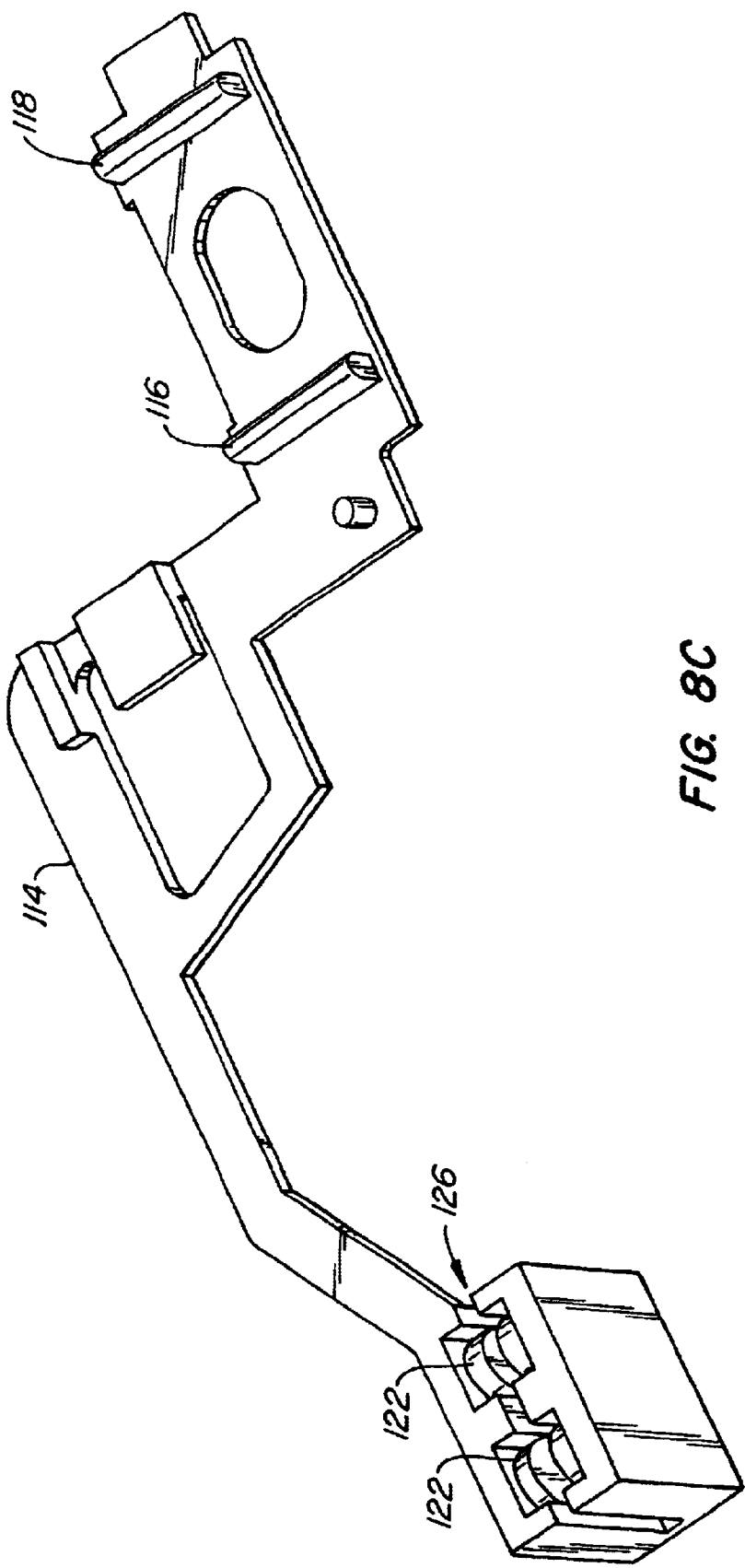

FIG. 8C is a perspective view showing just the plate or brake link 114 in isolation. This gives a better view of the plate, including the ribs 116 and 118, and the magnets 122. A slot 126 between the magnets is where the coil 124 (on its own PC board) of FIG. 8B is mounted. The coil, when activated, will interact with magnets 122, causing the plate to either move to the right or left as shown in FIG. 8C. This system also relies on the movement by the user, since the ribs will come in contact with the wheel, but continued rotating by the user's finger increases the pressure against the rib, providing the resistance feel.

Other variations of the above embodiments could be used. For example, multiple magnet/brake combinations could be used, with one creating a low friction force and another creating a high friction force. Alternately, different sets of brakes could be used for creating resistance in one direction versus the other direction. Multiple pairs of magnets/brakes can create multiple effects which can be individually selected for each direction, and even combined by activating both magnets/brakes for one direction resulting in a very high braking force for that direction.

The above embodiments show actuation using a voice coil or other coil or actuator which has two positions, on and off. Alternately, an analog system could be used to vary the amount of resistance provided by the brake.

As will be understood by those with skill in the art, the present invention may be embodied in other specific forms without departing from the essential characteristics thereof. For example, other braking mechanisms or autoblocking mechanisms than those set forth above could be used. In addition, the wheel could be located on a track ball, joystick, keyboard, game pad or any other input device to an intelligent host, such as a computer or game controller. The input device could be wireless, and derive its power from a battery. Accordingly, the foregoing description is intended to be illustrative, but not limiting, of the scope of the invention which is set forth in the following claims.

What is claimed is:

1. An input device comprising:
   a sensor for detecting movement of at least a portion of said input device;
   a wheel extending from said input device, said wheel being rotatably mounted about a wheel axis;
   an autoblocking mechanism for providing resistance to a force from a user's finger on said wheel, said resistance corresponding to an amount of force applied by said user's finger, wherein said autoblocking mechanism comprises a brake shoe having a concave shape, such that when biased against said wheel by said actuator, said brake shoe contacts said wheel at a first point on said brake shoe, and upon the turning of said wheel by said user, a second point on said brake shoe contacts said wheel; and
   an actuator, responsive to a control signal, for activating said autoblocking mechanism.

2. The input device of claim 1 wherein said actuator comprises a voicecoil connected to a pivot arm of said brake shoe, for tilting said brake shoe upon activation of said voicecoil.

3. The input device of claim 1 wherein said actuator tilts said brake shoe down when a user is rotating said wheel down toward said brake shoe, and tilts said brake show up when said user is rotating said wheel up toward said brake shoe.

4. The input device of claim 1 wherein said second point on said brake shoe has an angle to said wheel greater than a friction angle, such that excess force by said user rotating said wheel will cause said wheel to skip.

5. The input device of claim 1 wherein said actuator comprises an electromagnet, said brake shoe has a shaft with an imbedded magnet, such that an interaction between said electromagnet and said shaft causes said shaft to rotate.

6. An input device comprising:
   a sensor for detecting movement of at least a portion of said input device;
   a wheel extending from said input device, said wheel being rotatably mounted about a wheel axis;
   an autoblocking mechanism for providing resistance to a force from a user's finger on said wheel, said resistance corresponding to an amount of force applied by said user's finger, wherein said autoblocking mechanism comprises a plate positioned on an opposite side of said wheel from said user's finger, said plate having first and second ribs positioned on opposite sides of said wheel, such that lateral movement of said plate causes one of said ribs to engage a periphery of said wheel; and
   an actuator, responsive to a control signal, for activating said autoblocking mechanism.

7. The input device of claim 6 wherein said actuator comprises:
   a coil and magnet arrangement at an opposite end of said plate from said ribs, one of said coil and magnet being connected to said plate.

8. An input device comprising:
   a sensor for detecting movement of at least a portion of said input device;
   a wheel extending from said input device, said wheel being rotatably mounted about a wheel axis;
   a brake for providing a braking action on said wheel at a position on said wheel removed from said axis of said wheel;
   an electromagnetic actuator, responsive to an open loop control signal, for biasing said brake against said wheel; wherein said electromagnetic actuator and brake comprise:
   a first electromagnet;
   a first roller connected to said first electromagnet, and being positioned to engage said wheel upon activation of said first electromagnet;
   a second electromagnet;
   a second roller connected to said second electromagnet, and being positioned to engage said wheel upon activation of said second electromagnet;
   said first roller is connected to said first electromagnet by a first lever arm such that said first roller contacts said wheel at a point above a line between an axis of said wheel and connection of said first lever arm to said first electromagnet; and
   said second roller is connected to said second electromagnet by a second lever arm such that said second roller contacts said wheel at a point above a line between an axis of said wheel and connection of said second lever arm to said second electromagnet.

* * * * *